United States Patent

[11] 3,607,890

| [72] | Inventor | Pierre Mastagli<br>Paris, France |
| --- | --- | --- |
| [21] | Appl. No. | 862,495 |
| [22] | Filed | Sept. 30, 1969 |
| [45] | Patented | Sept. 21, 1971 |
| [73] | Assignee | Serdex-Societe D'Etudes, De Recherches,<br>De Diffusion Et D'Exploitation<br>Levallois-Perret, France |
| [32] | Priority | Oct. 14, 1968 |
| [33] |  | France |
| [31] |  | 169,758 |

[54] PROCESS FOR THE EXTRACTION OF A FRACTION OF THE UNSAPONIFIABLE OF A VEGETABLE OIL
7 Claims, No Drawings

| [52] | U.S. Cl. | 260/397.25 |
| --- | --- | --- |
| [51] | Int. Cl. | C07c 167/40 |
| [50] | Field of Search | 260/397.2 |

*Primary Examiner*—Elbert L. Roberts
*Attorney*—Oldham & Oldham

ABSTRACT: This process for the extraction of a fraction, principally citrostadienolic and/or cycloarthenolic, of the unsaponifiable of the vegetable oil comprises contacting the oil with dimethylformamide to form a dimethylformamide phase wherein the fraction is dissolved, separating said phase and then isolating the fraction therefrom.

PROCESS FOR THE EXTRACTION OF A FRACTION OF THE UNSAPONIFIABLE OF A VEGETABLE OIL

This invention relates to the treatment of fatty materials and, more particularly, to the extraction of the unsaponifiable portion, designated "the unsaponifiable" for brevity, of a vegetable oil. A definition and a procedure for the preparation of the unsaponifiable will be found in the United States Pharmacopoeia, Vol. 17, 1965, page 873.

It is known that vegetable oils are formed for the major part of fatty acid glycerides, these being saponifiable with an alkaline base into glycerine and fatty acid soaps. In addition to such glycerides, vegetable oils include the unsaponifiable which comprises various steroids. Among the latter, sitosterol and cirtostadienol have little value. In contrast, cycloarthenol and citrostadienol are most valuable due to their anti-inflammatory therapeutical properties.

Several processes for the extraction of the combined unsaponifiable material are already known.

One of these comprises presaponifying the fatty material and subsequently extracting the unsaponifiable from the resulting soaps. One is thus led to destroy the molecular structure of the fatty material to extract the unsaponifiable which constitutes only 1–5 percent with respect to the fatty material. In the case of edible oils, such as maize oil, this extraction causes the loss of the oil itself which is degraded into a product that can only be used suitably in soap making.

A second process comprises submitting a mixture of fatty materials and of a solvent for the unsaponifiable to the action of ultrasounds and then separating the unsaponifiable-enriched solvent from the mixture and collecting said solvent from its solution.

The solvents advocated are ethyl alcohol, ethyl ether and butyl ether The structure of the edible oil is thus maintained undamaged and also, therefore, its food and market value.

Unfortunately, the yield is low because, since the unsaponifiable is highly soluble in the oil from which it is to be extracted, the enrichment of the solvents is fairly low. Moreover, the sitosterol and the tocopherols are also contained in the extract.

The invention contemplates overcoming such drawbacks by means of a particularly selective extraction process.

This process for the extraction of a fraction, principally citrostadienolic and/or cycloarthenolic, of the unsaponifiable of a vegetable oil is particularly characterized in that it comprises contacting the oil with dimethylformamide to form a dimethylformamide phase wherein the fraction is dissolved, separating said phase and then isolating the fraction therefrom.

It was found, indeed, that the partition coefficient between the vegetable oils and dimethylformamide, an inexpensive commercially available material, is highly favorable to the migration of the unsaponifiable in this material.

Better still, it was found that dimethylformamide becomes enriched selectively not with the total unsaponifiable but essentially with the valuable compounds contained therein. Thus, these active compounds may be stripped with a single process of both the soaps and tocopherols and other sitosterol contaminating materials.

The invention has also for its object to provide a fraction of the unsaponifiable of a vegetable oil obtained by a process such as defined below.

Advantageously, the contacting may be conducted by thoroughly admixing the oil and the dimethylformamide at a temperature of about 60° C. to about 70° C., at the rate of 1–2 liters of dimethylformamide per liter of oil.

The mixture is then allowed to cool to room temperature and to rest during several hours. The mixture separates into two layers, the upper layer being the oily layer. The lower dimethylformamide phase is then decanted and collected.

The same oil may be treated a plurality of times with further portions of dimethylformamide to obtain an improved extraction.

Each time, the desired fraction may be isolated from the dimethylformamide phases by vacuum distillation until the major part of the dimethylformamide is removed, followed by washing the residue with very hot water which entrains the traces of remaining dimethylformamide.

The small amounts of glycerides entrained in the residue are removed by saponification, crystallization from a convenient solvent such as alcohol, and filtration. The solvent is evaporated to give the desired fraction.

Particularly interesting results were obtained on application of the process of the invention to palm oil, olive oil, maize oil, and the like.

According to an embodiment of the invention: (a) one part by volume of oil is contacted with 1–2 parts by volume of dimethylformamide, with stirring, at 60°–70° C., during at least 1 minute, (b) the mixture is allowed to separate at room temperature during at least 24 hours to obtain two phases, a supernatant oily phase and a lower dimethylformamide phase containing said fraction, (c) the lower phase is separated from the upper phase, (d) the three preceding steps are repeated a number of times with said supernatant upper oily phases, (e) the dimethylformamide phases are combined and are distilled in vacuo to recover the dimethylformamide and to obtain a distillation residue, (f) this residue is saponified with an alkali metal hydroxide in alcohol solution and the remaining soap is then removed by filtration, (g) the alcohol is evaporated from the filtrate which is then taken up into ethyl acetate to give a solution which, on evaporation of the solvent, gives said desired fraction.

The following examples illustrate the invention without, however, limiting same.

EXAMPLE 1

Twenty-five liters of dimethylformamide are added to 25 liters of maize oil. While stirring the mixture by blowing air through it, the mixture is heated at 65° C. and is maintained at this temperature during at least 1 minute, for example during about 1–2 minutes. The mixture is then allowed to separate during at least 24 hours at room temperature. The mixture separates into two layers. The surnatant oily phase becomes entirely decolorized within 2–3 hours while the lower dimethylformamide phase becomes discolored as it becomes enriched with sterols.

This colored phase is then separated.

The preceding steps are repeated four times with the same oil, decantation being effected increasingly rapidly.

Each colored dimethylformamide phase is treated in the following manner:

Vacuum distillation (40 mm. of mercury) is carried out at 76° C. When the major part of the dimethylformamide has been removed, the material is washed with very hot water to entrain the traces of dimethylformamide.

The 4,250 g. of remaining product (distillation residue) are saponified with 800 g. of alkali metal hydroxide, such as sodium hydroxide, dissolved in 10 liters of absolute alcohol, during 3 hours. The soap is allowed to crystallize from the alcohol and the crystals are then filtered off.

The alcohol is then evaporated from the filtrate which is then taken up into ethyl acetate. Filtration and evaporation of the ethyl acetate give the unsaponifiable fraction which is purified by a last saponification.

The yield in active sterols is of about two parts for 1,000 parts of oil.

EXAMPLE 2

The procedure of example 1 is repeated, starting from 3 liters of palm oil in admixture with 3 liters of dimethylformamide. However, care is taken never to allow the temperature of the palm oil to drop below 25° C.

The colored dimethylformamide phases are distilled under 12 mm. of mercury at 55° C. 120 g. of product are collected in the distillation flask. Purification is carried out by saponification, treating with 20 g. of sodium hydroxide dissolved in 100 cc. of absolute alcohol during 3 hours.

The yield in active sterols is of about 3-4 parts per 1,000 parts of oil.

EXAMPLE 3

The procedure of example 1 is repeated, starting from olive oil. The yield in active sterols is of about two parts per 1,000 parts of starting oil.

Although specific embodiments of the invention have been described, many modifications and changes may be made therein without departing from the scope of the invention as defined in the appended claims.

Having now described my invention what I claim as new and desire to secure by Letters Patent is:

1. A process for the extraction of a fraction, principally citrostadienolic and cycloarthenolic, of the unsaponifiable of a vegetable oil, comprising contacting one part, by volume, of said oil with 1-2 parts, by volume, of dimethylformamide under conditions to give a dimethylformamide phase wherein said fraction is dissolved, separating said phase and then isolating said fraction therefrom.

2. Process as claimed in claim 1, wherein the contacting is carried out by admixing the oil and the dimethylformamide at a temperature of about 60°-70° C. and the dimethylformamide phase is separated by cooling at room temperature and decantation.

3. Process as claimed in claim 1, wherein the fraction is isolated as a residue by vacuum distillation of the dimethylformamide phase.

4. Process as claimed in claim 3, wherein the distillation residue is purified by saponification of the remaining glycerides and removal of the resulting soaps.

5. Process as claimed in claim 1, wherein the same starting oil is contacted with several successive portions of dimethylformamide to give several dimethylformamide phases from which the unsaponifiable fraction is then isolated.

6. Process as claimed in claim 1, wherein the oil is maize oil, palm oil or olive oil.

7. Process for the extraction of the citrostadienolic and cycloarthenolic fraction of the unsaponifiable of an oil selected from the group consisting of maize oil, palm oil and olive oil, wherein:

a. one part, by volume, of oil is contacted with 1-2 parts, by volume, of dimethylformamide, with stirring, at 60°-70° C., during at least one minute, to obtain a mixture, b. the mixture is allowed to separate at room temperature during at least 24 hours to obtain two phases, a supernatant oily phase and a lower dimethylformamide phase containing said fraction, c. the lower phase is separated from the upper phase, d. the three preceding steps are repeated a number of times with said supernatant upper oily phase, e. said dimethylformamide phases are combined and are distilled in vacuo to recover the dimethylformamide and to obtain a distillation residue, f. said residue is saponified with an alkali metal hydroxide in alcoholic solution and the remaining soap is then removed by filtration, g. said alcohol is evaporated from the filtrate which is then taken up into ethyl acetate to give a solution which, on evaporation of the solvent, gives said desired fraction.